United States Patent [19]

Hart et al.

[11] Patent Number: 4,601,892
[45] Date of Patent: Jul. 22, 1986

[54] PROCESS FOR PRODUCING CARBON BLACK

[75] Inventors: C. Jack Hart; Lawrence K. Murray; David L. Rogers, all of Bartlesville, Okla.; Richard T. Divis, Orange, Tex.

[73] Assignee: Phillips Petroleum Company, Bartlesville, Okla.

[21] Appl. No.: 480,203

[22] Filed: Mar. 30, 1983

[51] Int. Cl.⁴ .................. C01B 31/02; C09C 1/48
[52] U.S. Cl. .................. 423/456; 423/450; 423/455; 423/457
[58] Field of Search ........... 423/449, 450, 455, 456, 423/457; 422/150

[56] References Cited

U.S. PATENT DOCUMENTS

| | | | |
|---|---|---|---|
| 2,616,795 | 11/1952 | Krejci | 23/209.8 |
| 2,878,104 | 3/1959 | Reed | 23/209.6 |
| 2,917,370 | 12/1959 | Edminster et al. | 23/209.4 |
| 3,409,406 | 11/1968 | Murray | 23/259.5 |
| 3,490,869 | 1/1970 | Heller | 23/209.4 |
| 3,560,164 | 2/1971 | Venable, Jr. | 23/259.5 |
| 3,701,827 | 10/1972 | Dahmen | 423/456 |
| 3,748,100 | 7/1973 | Forseth | 23/259.5 |
| 3,972,986 | 8/1976 | Forseth | 423/456 |

Primary Examiner—Gregory A. Heller
Attorney, Agent, or Firm—John R. Casperson

[57] ABSTRACT

A generally cylindrical carbon black reactor for the production of soft carbon blacks is modified to produce a wider range of products by the installation of a choke.

7 Claims, 6 Drawing Figures

PROCESS FOR PRODUCING CARBON BLACK

BACKGROUND OF THE INVENTION

The invention relates to a carbon black reactor. In another aspect, the invention relates to a method for producing carbon black.

Two types of carbon black are commonly used by the rubber industry for reinforcing rubber. The first is the so-called hard carbon black which imparts high wear resistance to rubber into which it has been compounded. Hard carbon black is generally used to make vehicular tire treads. Another type of carbon black, which imparts a different set of properties to rubber, is a so-called "soft" carbon black. Soft carbon blacks are generally used to reinforce rubber where a great deal of flexing is expected to be encountered, such as in tire carcasses. Hard carbon blacks are commonly classified as being in the N100, N200, or N300 series. Some soit carbon blacks are commonly classified as being in the N500, N600, and N700 series. The processes for making soft and hard carbon blacks differ considerably.

Reactors for the production of soft carbon blacks, which are characterized by large particle size, are generally characterized by large size and attendant low velocities of reactants. Where an oil feedstock is converted to a soft carbon black by pyrolysis of the oil feedstock with hot gases, the pyrolysis reaction can be conducted in a reactor which is vertically positioned, of cylindrical configuration, and of substantially uniform diameter throughout its length.

Generally speaking, smaller particle carbon blacks, toward the hard end of the scale, are produced as reactant velocities increase. However, in a given plant, there is a limit as to the velocities which can be achieved in a given reactor. The limitation is nearly always found in the air compressors, which are incapable of moving enough air to generate high velocity in a large reactor, although they can yield high or low velocity in a small reactor. Therefore, reactors with smaller diameters frequently provide greater flexibility in product production than large reactors. On the other hand, the large reactors are desirable from the standpoint of producing large particle carbon black, for example carbon black in the N700 series, at an acceptable rate.

It would be very desirable to provide a carbon black reactor capable of the flexibility of operation which is usually associated with a smaller reactor and the product throu8hput usually associated with a larger reactor.

OBJECTS OF THE INVENTION

It is an object of this invention to provide an improvement to a large carbon black reactor of cylindrical configuration to provide for improved product flexibility without excessive sacrifice in product throughput rate.

SUMMARY OF THE INVENTION

According to one embodiment of the invention, a carbon black reactor comprises a refractory sidewall which defines three generally cylindrical zones which are serially connected and coaxially aligned. The first generally cylindrical zone has a first diameter of between about 40 inches and about 80 inches and has at least one tunnel opening generally tangentially through the refractory sidewall for the admission of free oxygen-containing gas. The zone is capped by a refractory upstream endwall having an axial passage therethrough for receipt of an oil feedstock injector. The second generally cylindrical zone has a second diameter which is smaller than the first diameter and is generally between about 30 inches and about 72 inches. The cross-sectional flow area defined by the refractory sidewall in the second generally cylindrical zone is generally between about 30 percent and about 80 percent of the cross-sectional area of the first zone, usually in the range of about 40 to about 70 percent, preferably in the range of 45-65 percent. The second generally cylindrical zone is in open communication with the first generally cylindrical zone at one end and with the third generally cylindrical zone at the opposite end. The third generally cylindrical zone has essentially the same diameter as the first generally cylindrical zone and is provided with one or more ports extending radially through the refractory sidewall to provide for the introduction of a quench fluid. Such a reactor can provide a wide range of product production and is simple and easy to make.

In another embodiment of the present invention, the above-described reactor can be operated to produce carbon black by introducing a hot free oxygen-containing gas generally tangentially into the first generally cylindrical zone through the refractory sidewall. A carbonaceous feedstock is introduced into the first generally cylindrical zone from an axial position through the upstream refractory endwall and forms a reaction mixture of the hot, free oxygen-containing gases and carbonaceous feedstock. This reaction mixture is flowed axially from the first generally cylindrical zone and axially into the second generally cylindrical zone which desirably has a length sufficient to provide the reaction mixture sufficient time to at least partially pyrolyze and form carbon black-containing smoke. The carbon black-containing smoke is flowed axially from the second generally cylindrical zone and axially into the third generally cylindrical zone where it is quenched with a suitable quench fluid to below carbon black forming temperatures.

DETAILED DESCRIPTION OF THE INVENTION

Figure 1:
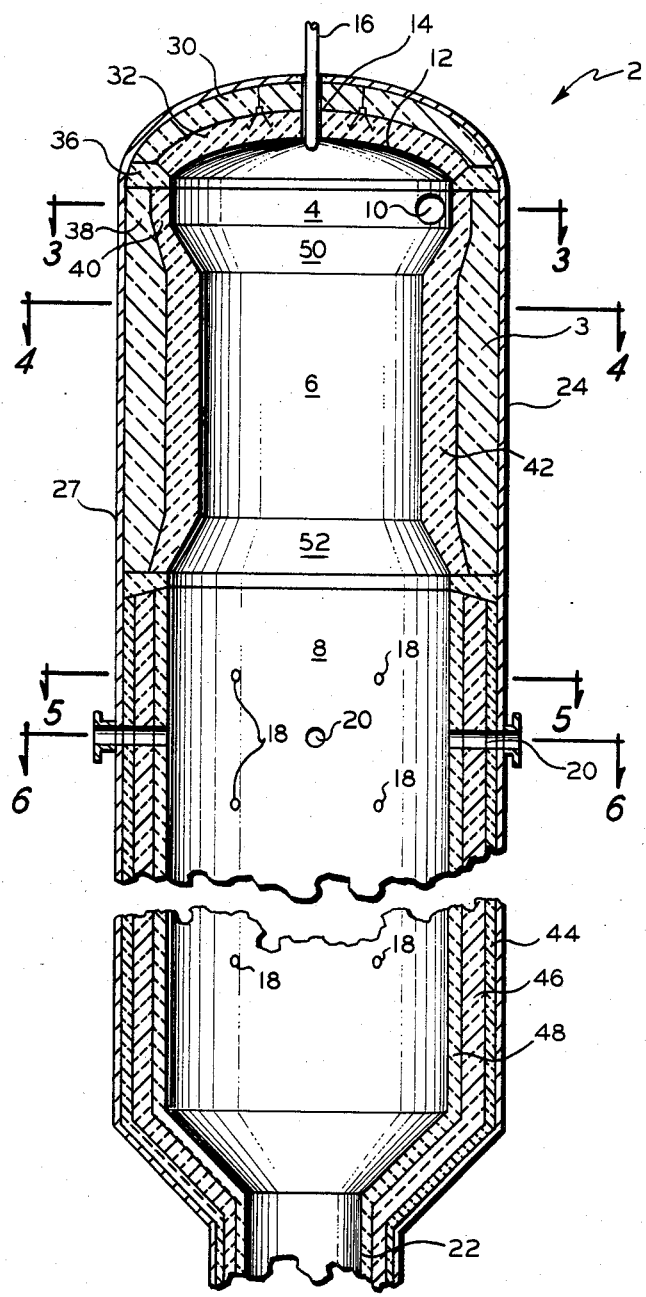
FIG. 1 illustrates a longitudinal fragmental cross section of a carbon black reactor oriented along the line 1—1 of FIG. 3.

With reference to FIG. 1, a carbon black reactor 2 comprises a refractory sidewall 3 which defines, serially connected and coaxially aligned, a first generally cylindrical zone 4, a second generally cylindrical zone 6, and a third generally cylindrical zone 8. The first generally cylindrical zone 4 has at least one tunnel or tube 10 oriented and opening generally tangentially through the refractory sidewall 3 into the zone 4 for the admission of free oxygen-containing gas. Preferably a second tunnel 11 also opens generally tangentially into the generally cylindrical zone 4. The zone 4 is capped at the upstream end by refractory upstream endwall 12 having an axial passage 14 therethrough for the receipt of an oil feedstock injector 16. The third generally cylindrical zone 8 is provided with one or more ports 18 longitudinally and circumferentially spaced apart extending radially through the refractory sidewall 3 to provide for the introduction of quench fluid. For certain applications, it is also desirable that the zone 8 be provided with tunnels 20 opening into the zone 8 through the refractory sidewall for the admission of gases. At the downstream end of the zone 8 there can be provided an outlet conduit 22 for the conveying away of process products for recovery.

The refractory sidewall and endwall will usually be formed from several layers of refractory materials. A suitable outermost layer comprises a shell 24 which is usually formed from a metal such as steel. Layers of refractory inside of the shell 24 are usually formed from firebricks or varioustypes of castable or sprayable refractories. Preferably, where the reactor 2 is vertically oriented, the refractory sidewall 3 is formed from layers of castable refractory, which may be pneumatically applied, as by gunniting. The upstream endwall 12 can also be formed from castable refractory.

A suitable upstream endwall 12 can be dome-shaped with an inside radius of curvature about twice that of the diameter of the zone 4. Chevron anchors 26 and metal clips or extensions 28 are welded to the inside of the shell 24 at spaced locations thereon. Additional chevron anchors 26 can be attached to the clips 28 from the inside of the reactor 2 to assist in securing successive layers of the refractory material. A layer 30 of light weight insulating refractory capable of withstanding a temperature of about 3000° F. is then pneumatically applied against the shell to form a layer having a thickness of about 7 inches. A suitable material for forming the layer 30 is sold as Kast-O-Lite 30GR, which is a semi-insulating castable refractory available from A.P. Green Refractory. A layer 32 of a dense high-alumina, high-temperature refractory is then applied onto the layer 30 to form the hot surface. A suitable refractory for this application is Purotab gun mix available from Kaiser Refractory. To prevent refractory damage around the anchors 26 due to the temperature differential between the layers 32 and 30 when the apparatus is used, a layer of 60 mil refractory fiber paper can be wrapped around the head of the refractory anchors prior to the application of the layer 30.

The layers 30 and 32 of the dome rest on a circle of skewback bricks 36 which form a circle around the top of the generally cylindrical portion of the reactor. Beneath the skewbacks 36, the first generally cylindrical zone 4 is defined by the generally cylindrical portion 27 of the reactor shell 24. Clips 28 attached to the inside of the generally cylindrical portion 27 of the shell anchor a cold layer 38 of refractory. The layer 38 is capable of withstanding a temperature of about 3000° F. A suitable layer 38 can be formed from Kast-O-Lite 30GR previously mentioned. Positioned inside of the layer 38 is the hot layer 40 which defines the sidewall of the generally cylindrical zone 4. The layer 40 is retained in position by the anchors 26. It should be capable of withstanding a temperature of about 3300° F. A suitable layer 40 can be formed from Purotab which can be pneumatically applied to form the desired shape.

The second generally cylindrical zone 6 is defined by a layer 42 of refractory which is formed into the desired shape with a pneumatic ramming process using a combination of forms. It should be capable of withstanding high temperatures, of up to 3400° F. without deterioration. A suitable material for forming the refractory layer 42 is Jade Pak-88-P which is available from A.P. Green Refractory.

To form the third generally cylindrical zone 8, a relatively thin layer 44 of insulating refractory is bonded to the generally cylindrical portion 27 of shell 24. A suitable layer 44 can be formed by a refractory capable of withstanding a temperature of about 2200° F. Kaolite 2200, which is available from Babcock & Wilcox Refractory has been used with good results. A layer 46 is bonded to the inside of the layer 44. The layer 46 should be capable of withstanding a temperature in the range of about 3000° F. A suitable layer 46 was formed from Kast-O-Lite 30. A layer 48 is bonded to the inside of the layer 46. The layer 48 should be formed from a refractory capable of withstanding temperatures of up to about 3000° F. or so. Suitable materials include Kaokast Refractory or Purotab, for example.

Figure 2:
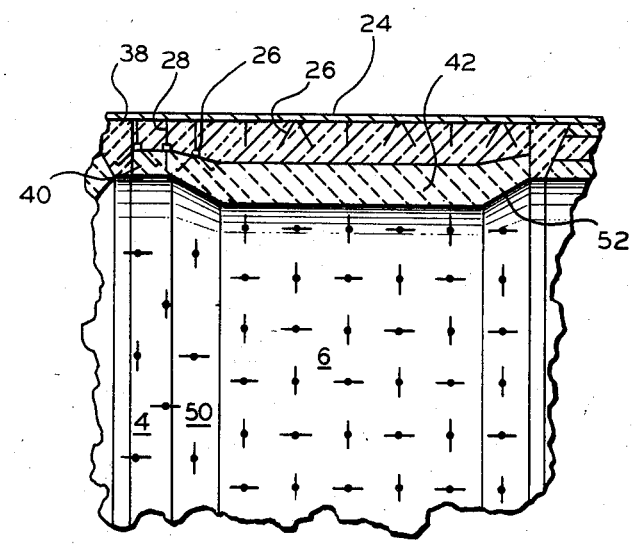
FIG. 2 is a fragmental view of the upper portion of the reactor showing the relative location of the anchors through the refractory.
Figure 3:
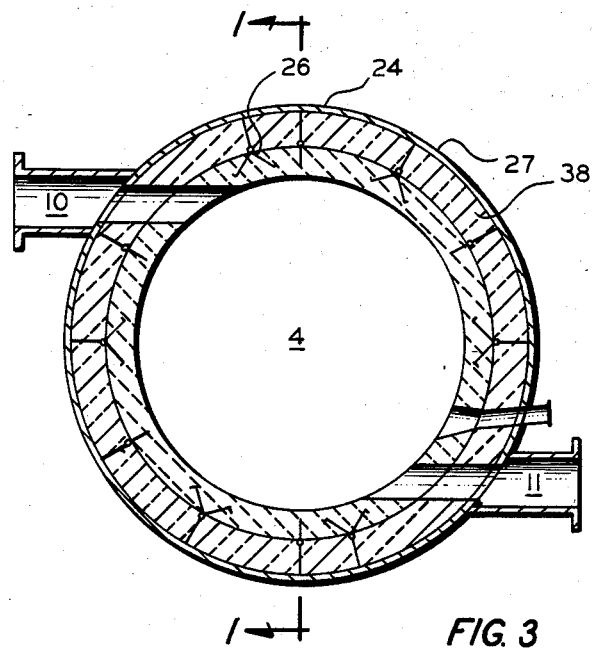
FIG. 3 is a cross-sectional view of the apparatus of FIG. 1 viewed through the plane 3—3 of FIG. 1.
Figure 4:
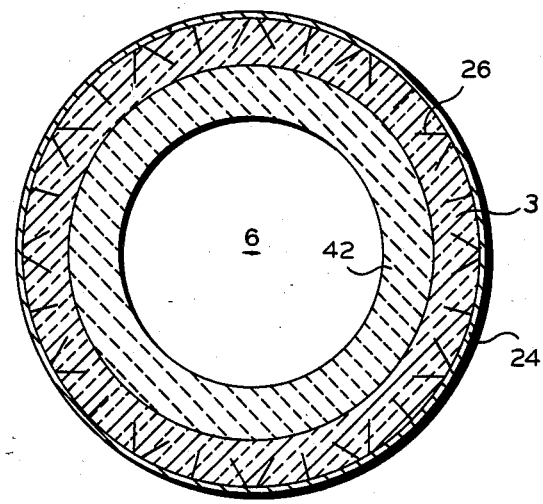
FIGURE 4 is a cross-sectional view of the apparatus of FIG. 1 viewed through the plane 4—4 of FIG. 1.

For good results, the refractory anchors 26 and clips 28 which reinforce the refractory defining the zones 4 and 6 should be arranged in a staggered array as illustrated in FIGS. 2, 3 and 4 for example.

The first zone 4 and third zone 8 generally have a diameter of between about 40 inches and about 80 inches to make them well suited for the production of large particle carbon black, such as N600 and N700 series carbon blacks. N600 and N700 series carbon blacks generally exhibit a surface area of less than about 42 square meters per gram as measured by the CTAB method, such as having a particle size sufficient to yield a surface area in the range of from about 30 to about 42 meters squared per gram. The second generally cylindrical zone 6 has a diameter which is generally between about 30 inches and about 72 inches and is smaller than the diameter of the first zone 4 and the third zone 8. Generally, the cross-sectional area defined by the refractory material defining the second zone 6 will be such that the cross-sectional area of the second zone 6 is in the range of from about 30 percent to about 80 percent of the cross-sectional area of the first zone 4. It is the second zone 6 which renders the reactor 2 well adapted for the production of carbon blacks in the N500 series. Carbon blacks in the N500 series generally will exhibit a CTAB surface area in the range of from about 42 to 50 meters squared per gram.

The first generally cylindrical zone 4 will usually have a length in the range of from about 10 percent to about 50 percent of its diameter. The only important feature of the length of the generally cylindrical zone 4 is that it be sufficiently long to provide for the tangential entry 10 emptying into the reactor through a generally cylindrical sidewall since this will simplify casting a suitable refractory shape. It should not be so long, however, that much of the carbon-forming reaction occurs in it. The second generally cylindrical zone 6 will usually have a length in the range of from about 50 percent to about 200 percent of its diameter. The length of the generally cylindrical zone 6 should be sufficient to provide for formation of the carbon blacks in the N600 and N700 series when the reactor is operated under suitable conditions. The length of the second generally cylindrical zone 6 however should not be so long so as to prevent production of N700 series carbon blacks at desirably high production rates.

To reduce the pressure differentials which would otherwise be incurred by utilization of the generally cylindrical zone 6 it is desirable to provide the reactor with a first frustoconical transition zone 50 which extends between the generally cylindrical first zone 4 and the generally cylindrical second zone 6. In FIG. 2, the refractory wall which defines the generally frustoconical transition zone 50 can be a part of the layer 40 previously described. Preferably, the sidewall of the generally frustoconical converging zone 50 converges toward the reactor axis at an angle in the range of from about 20° to 40° as measured from the reactor axis. A converging angle of about 30° has been used with good results.

To further mitigate pressure differential problems which would otherwise be incurred, it is desirable to provide the reactor 2 with a second frustoconical transition zone 52 which connects the second zone 6 with the third zone 8. The second generally frustoconical transition zone 52 can be defined by a portion of the refractory layer 42 if desired. Although most any angle of divergence can be used, particular preferred diverging angles for the second generally frustoconical zone 52 with respect to the reactor axis range from about 7° up to about 45° with an angle of divergence of about 30° with respect to the reactor axis having been used with good results.

When in use, an oil injector 16 will be positioned in the passage 14 through the upstream endwall 12. The injector 16 can be equipped with any of a wide variety of oil nozzles with good results. A particularly advantageous nozzle which has been used in the present reactor for the production of carbon blacks in the N500 and N600 series is characterized by emission of discrete feedstock streams in a pattern which suggests a hollow cone. For larger particle carbon black, such as carbon blacks in the N700 series, a nozzle capable of greater atomization is desirable, due to the less intense mixing conditions required into zones 4 and 6. A bifluid nozzle would thus be recommended for these applications.

Where process conditions do not provide for preheating the free oxygen-containing gases introduced into the reactor through the tunnels 10 by indirect heat exchange, it is desirable that a burner be positioned in each of the tunnels for supplying a combustible oil or gas for combustion so that the gases entering the zone 4 through the tunnels 10 will be at a sufficiently high temperature to provide the pyrolysis reaction. Generally, a water injector 60 will be positioned in at least one of the ports 18 through the sidewall of the third zone 8 to quench the reaction mixture flowing through the reactor to a temperature within the material temperature limits of downstream equipment. Generally, the water injector will be positioned in the third zone at a distance of between about 6 and about 30 feet from the oil injector 16, the end nozzle of which is usually positioned about flush with the upstream endwall 12 of the reactor.

Figure 5:
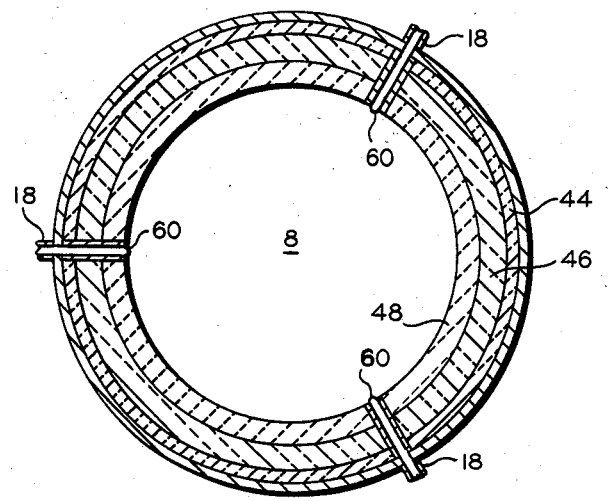
FIG. 5 is a cross-sectional view of the apparatus of FIG. 1 viewed through the plane 5—5 of FIG. 1.
Figure 6:
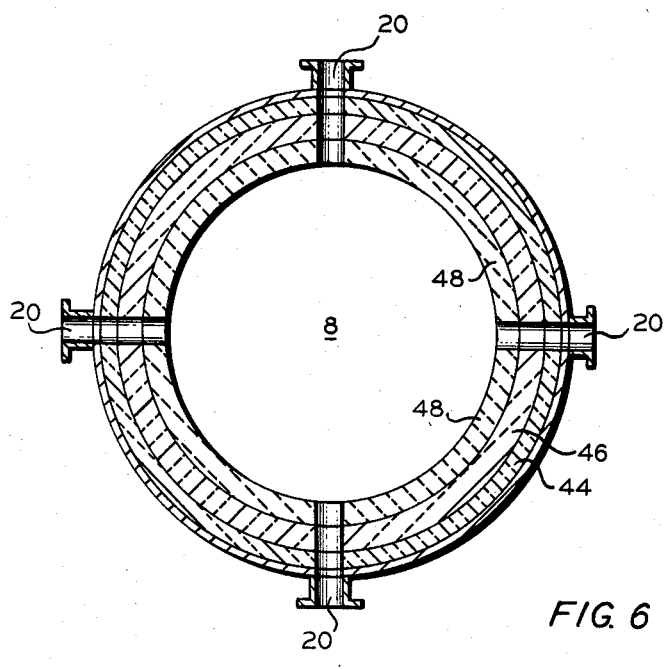
FIG. 6 is a cross-sectional view of the apparatus of FIG. 1 viewed along line 6—6.

Various types of water injectors 60 can be used. In FIG. 5, the apparatus can be provided with one or more radially inward directed injectors 60. If desired, it is possible to extend one injector 60 to the axis of the reactor and direct the fluid flowing therethrough at a right angle so that it is emitted generally axially upstream or downstream in the reactor. The fluid flowing through the injector 60 can be atomized if desired with atomizing fluid such as steam. Whatever details are chosen, it is desirable that the injector 60 provide good distribution of quench fluid into the zone 8.

The reactor so far described can be used to produce carbon black by a process comprising introducing a hot free oxygen-containing gas generally tangentially via tunnel 10 into a first generally cylindrical zone such as zone 4 where the zone 4 has a first diameter of between about 40 and 80 inches, usually between about 45 and 70 inches, preferably about 60 inches, having a tunnel 10 opening generally tangentially through the refractory sidewall of the zone 4. The carbonaceous feedstock is introduced generally axially into the first generally cylindrical zone 4 through the upstream refractory endwall 12 which caps the first generally cylindrical zone to form a reaction mixture with the hot free oxygen-containing gases introduced into the zone from the tunnel 10. The reaction mixture flows generally axially from the first generally cylindrical zone 4 and axially into the second generally cylindrical zone 6, preferably through a generally frustoconical converging zone 50. The second generally cylindrical zone 6 has a diameter in the range of between about 30 and about 72 inches, usually between about 36 and 60 inches, and preferably between about 40 and about 50 inches and a length which is sufficient to provide the reaction mixture sufficient time to at least partially pyrolyze and form a carbon black containing smoke. The carbon black containing smoke is flowed axially from the second generally cylindrical zone and axially into a third generally cylindrical zone 8 which has a third diameter which is essentially the same as the first diameter. Preferably, the carbon black containing smoke flows through a generally frustoconically shaped diverging zone 52 between the zone 6 and the zone 8. In the zone 8, the carbon black containing smoke is quenched with a quench fluid such as water usually to a temperature of less than about 2000° F. such as in the range of about 1400° to about 2000° F. or less.

By providing a generally cylindrical soft black reactor with a second generally cylindrical zone as above described a wider range of products can be produced. To this end, it is very important that the generally cylindrical zone 6 have a length which is sufficient to influence the types of carbon black produced. The second generally cylindrical zone 6 will thus usually have a length in the range of from about 0.5 to about 2 times its diameter. Preferably, the generally cylindrical zone 6 will have a length which is in the range of from about 0.7 to about 1.5 times its diameter. Most preferably, the length of the zone is slightly greater than its diameter.

For certain types of carbon black, it is preferable that the carbonaceous feedstock be introduced into the first generally cylindrical zone in the form of a hollow cone-shaped spray pattern of individual coherent streams. For other applications, particularly for the production of larger particle carbon blacks, it is desirable that the feedstock stream be finely atomized because of the less turbulent conditions generally employed in the production of very large size particle carbon black such as carbon blacks in the N700 series. Where the individual feedstock streams are used, a nozzle which emits from between about 4 and about 16 individual coherent streams of feedstock can be used to define a cone shaped pattern with the cone diverging at an angle of from about 45° to about 90° for example. Good results are expected where a nozzle is used which emits about 8 individual streams of feedstock defining a cone shaped spray pattern which diverges at an angle of between about 45° to about 90°, such as about 60°.

In any event, it is important to quench the reaction to fix the properties of the produced carbon black. This is conveniently accomplished by introducing the quench fluid, usually water, into the third generally cylindrical zone at a distance from the carbonaceous feedstock injector which is in the range of from about 6 feet to about 30 feet. Generally, for the larger particle sizes the distance will be in the upper end of this range while for the smaller particle sizes, the distance will be in the lower end of this range.

Also, when producing larger sized particle carbon black, it is desirable to utilize the tunnels 20 to introduce an auxiliary air as this aids in maintaining stable process conditions for producing N700 series carbon blacks.

The invention is illustrated by the following example.

EXAMPLE

The original 60 inch diameter generally cylindrical vertical reactor was designed to (separately) produce N762, N650, and N550 carbon blacks, with tangential air rates of 333,000 standard cubic feet per hour to 474,000 standard cubic feet per hour for N762 and N550, respectively. In practice, this range in air rates was too narrow of a range for the broad range of desired products.

The 60 inch diameter reactor proved to be too large for efficient production of N550 at the design air rate, and quenching had to be effected sooner to reduce after-treatment (the blend of the carbon black in rubber giving too low modulus). Higher reaction rates and shorter reaction times were needed to produce the proper quality N550 carbon black.

To accomplish this higher reaction velocity and shorter residence or reaction time, the reactor diameter was choked from the original 60 inch diameter to the new 48 inch diameter. (It now is believed that even 42 inch diameter choke would be better for producing N550 carbon black.) Oil feedstock was injected axially from the concave dome at the top of the reactor. The hot tangential gases were introduced (180 degrees apart, using two 8 inch diameter entries) near the upper part of the reactor and in the 60 inch diameter zone, above the new 48 inch diameter choke. This upper 60 inch section was about 14 inches in length, and the center lines of the tangential entries were 9.125 inches downstream from the upper end of this 60 inch diameter zone. The 60 inch diameter zone had a conical section between it and the downstream 48 inch diameter choke, the conical section tapering inwardly from the 60 inch diameter to the 48 inch diameter for a longitudinal length of 10⅜ inches (at about 30 degrees with respect to the longitudinal axis of the reactor). The 48 inch diameter choke was 4 feet 7-13/16 inches in length. The apparatus then tapered outwardly to the lower 60 inch diameter zone using another conical section 10⅜ inches in length (at about 30 degrees to the longitudinal axis of the reactor). From then on, the reactor was 60 inches in diameter until the outlet, (located about 3 feet downstream from the final quench injection locus) where the reactor vessel conically converged to meet the outlet conduit, the outlet being about 2 feet-4 inches in diameter, and leading to collection and other plant equipment.

At about 1 foot 1-½ inches downstream from the inlet to the lower 60 inch diameter zone, beneath the 48 inch diameter choke, were three prequench water injection means at 120 degrees apart around the periphery of the reactor. The diameter of each quench entry was about 2 inches. Preferably the quench nozzle injects the quench countercurrently to the reactor axial smoke flow. Normally only one means is used with the single nozzle in the center of the reactor, the nozzle pointing upstream.

Secondary air injection, when used, as in N762 production, was located about 3 feet 9-½ inches downstream from the upstream end of this lower 60 inch diameter zone beneath the 48 inch diameter choke. Four ports at 90° spacing around the reactor were used, and these inlets were about 2 inch diameter. The secondary air inlets were about 2 feet, 8 inches downstream from the primary quench locus.

Final quench injection means were located 26 feet downstream from the upstream edge of the upper or first 60 inch diameter zone (whereinto the tangential hot gases were charged). Three radial quench injections, 120 degrees apart around the periphery of the reactor, were used, unjecting final quench water inwardly radially. This quench was for reactor outlet effluent temperature control to adjust the reactor effluent temperature to the desired temperature. Steam-water bifluid nozzles are now preferably used for quenching for all three types of soft blacks.

Tabulated hereinbelow are data for typical runs used for making N762, N650 and N550 carbon blacks.

TABLE

| | N550 | N650 | N762 |
|---|---|---|---|
| Oil: | | | |
| API gravity | 8.1 | 8.1 | 9.1 |
| Viscosity BMCI | 93 | 93 | 88 |
| Rate, U.S. gph | 1217 | 1280 | 1170 |
| kg/h | 4660 | 4900 | 4448 |
| Nozzle | Pipe cap with 8 holes, 60° angle | | 20° Peabody |
| Nozzle pressure, psig | 104 | 110 | 52 |
| KCl rate, ppm of oil | 14 | 15 | 100 |
| Total air rate, scfh | 530,280 | 484,970 | 435,600 |
| Air preheat, °F. | 730 | 690 | 770 |
| Natural gas rate, scfh | 13,850 | 13,150 | 12,800 |
| Net heating value, Btu/cf | 863 | 865 | 871 |
| Quench location, feet | 9.3 | 12 | 26 |
| Approximate quench water rate, gpm | 16 | 13 | 11.5 |
| Quench nozzle types | central rt. angle[1] | radial pressure[2] | radial Peabody[3] |
| Yield, | | | |
| lb/gal. oil | 4.50 | 4.94 | 4.85 |
| lb/lb. oil | .533 | .585 | .579 |
| % of total carbon | 58.0 | 63.9 | 63.0 |
| Unpelleted product properties | | | |
| CTAB | 45 | 41 | 31 |
| I₂ No. | 45 | 38 | 26 |
| Photelometer[4] 62 | 34 | 11 | |
| DBP | 132 | 142 | 64 |
| C-DBP | 88 | 89 | 58 |

[1] Spraying Systems ⅛ A60 (hollow cone)
[2] Spraying Systems ⅜ G22 (solid cone)
[3] Peabody AB6825S (bifluid)
[4] Toluene discoloration

What is claimed is:

1. A process for producing carbon black comprising introducing a hot free oxygen-containing gas generally tangentially into a first generally cylindrical zone having a first diameter of between about 40 and about 80 inches through a tunnel which opens generally tangentially through a refractory sidewall of the generally cylindrical zone;
introducing a carbonaceous feedstock generally axially into the first generally cylindrical zone through an upstream refractory endwall capping the first generally cylindrical zone for forming a reaction mixture with the hot, free oxygen-containing gas;

flowing the reaction mixture axially from the first generally cylindrical zone and axially into a second generally cylindrical zone having a second diameter which is less than the first diameter and in the range of between about 30 inches and about 72 inches and a length sufficient to provide the reaction mixture sufficient time to pyrolyze and form carbon black-containing smoke;

flowing the carbon black-containing smoke axially from the second generally cylindrical zone and axially into a third generally cylindrical zone having a third diameter which is essentially the same as the first diameter; and quenching the carbon black-containing smoke with a quench fluid in the third generally cylindrical zone to a temperature of 2000° F. or less.

2. A process as in claim 1 further comprising flowing the reaction mixture through a frustoconically shaped converging zone between the first generally cylindrical zone and the second generally cylindrical zone and a frustoconically shaped diverging zone between the second generally cylindrical zone and the third generally cylindrical zone, and wherein the reaction flow passage through the second generally cylindrical zone is 30-80 percent as large as the reaction flow passage through the first generally cylindrical zone.

3. A process as in claim 2 wherein the second generally cylindrical zone is provided with a length in the range of from about 0.5 to about 2 times its diameter, and the reaction flow passage through the second generally cylindrical zone is 40-70 percent as large as the reaction flow passage through the first generally cylindrical zone.

4. A process as in claim 3 further comprising introducing the carbonaceous feedstock into the first generally cylindrical zone in the form of a hollow cone-shaped pattern of individual coherent streams.

5. A process as in claim 4 wherein from between about 4 and about 16 individual streams of feedstock define the cone-shaped pattern and the cone diverges at from about 45° to about 90°.

6. A process as in claim 5 wherein 8 individual streams of feedstock define the cone-shaped pattern and the cone diverges at from about 45° to about 90°.

7. A process as in claim 4 further comprising introducing water into the third generally cylindrical zone as the quench fluid at a distance from the carbonaceous feedstock injector which is in the range of from about 6 feet to about 30 feet, and wherein the reaction flow passage through the second generally cylindrical zone is in the range of from 45 to 65 percent as large as the reaction flow passage through the first generally cylindrical zone.

* * * * *